Jan. 23, 1934.   J. J. STOETZEL   1,944,769
PNEUMATIC DISPATCH APPARATUS
Filed March 16, 1929
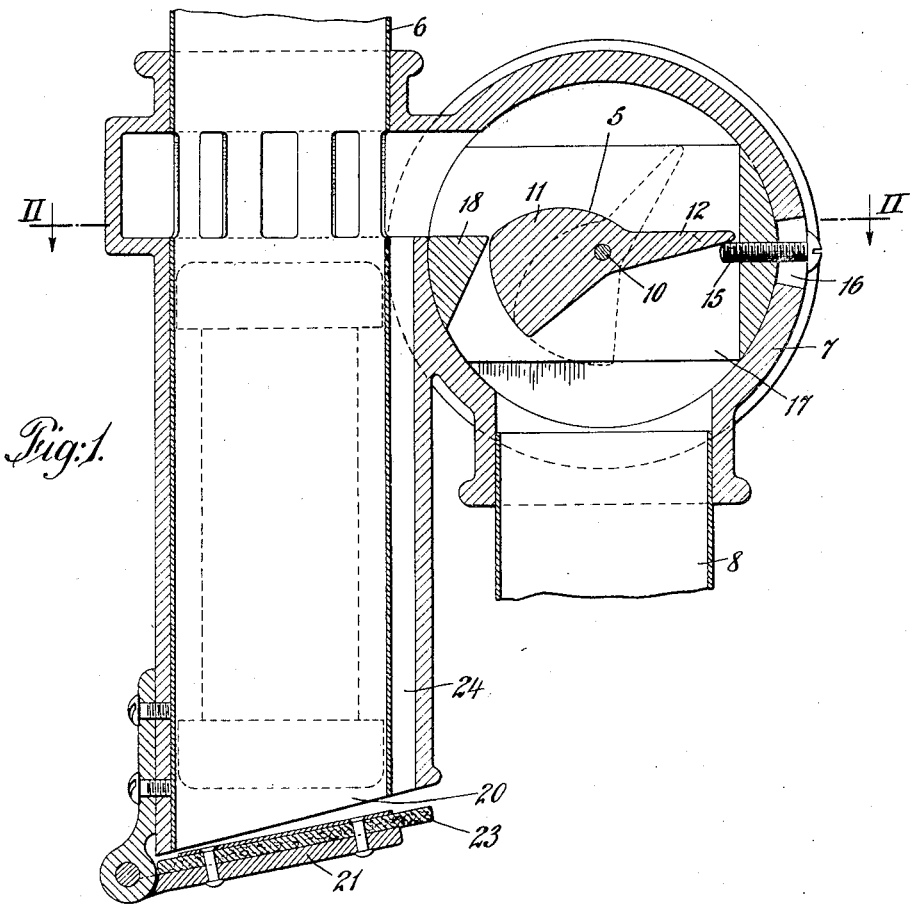
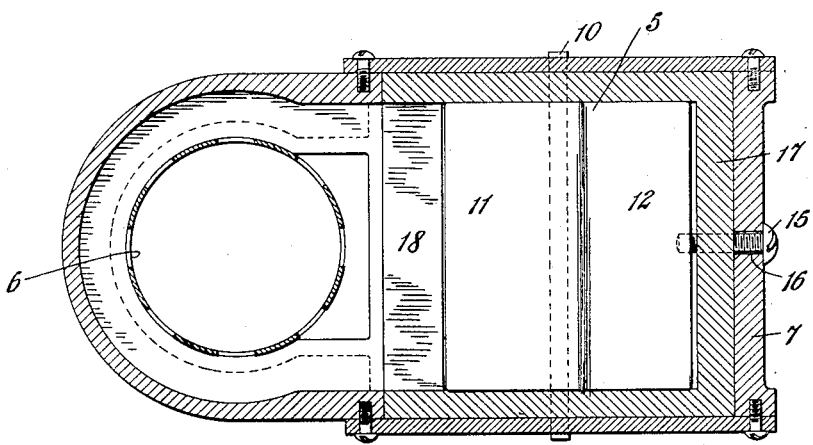
INVENTOR
JOSEPH J. STOETZEL
BY Merrell E. Clark
ATTORNEY Patented Jan. 23, 1934

1,944,769

UNITED STATES PATENT OFFICE 1,944,769

PNEUMATIC DISPATCH APPARATUS

Joseph John Stoetzel, Queens Village, N. Y., assignor to G & G Atlas Systems, Inc., New York, N. Y., a corporation of New York Application March 16, 1929. Serial No. 347,520

16 Claims. (Cl. 243—12)

The present invention relates to pneumatic dispatch tube systems and has for an object to provide an improved air controlling and regulating device of the minimum flow type.

It is desirable so to control the air flowing in the pneumatic tube line that when there is no carrier in the line a minimum flow of air will be maintained and when the line is loaded with one or more carriers an operative current of air will be induced.

The present invention provides an improved arrangement comprising a valve which will be maintained in substantially closed condition when the line is entirely open but will automatically open when the line is obstructed by a carrier inserted therein.

The nature and objects of the invention will be better understood from a description of a particular embodiment of the invention for the purpose of which description reference should be had to the accompanying drawing forming a part hereof and in which—

Figure 1 is a central sectional view of an improved valve and adjacent delivery outlet embodying the invention, and Figure 2 is a horizontal sectional view taken on the line II—II of Fig. 1.

The apparatus shown for the purposes of illustrating the invention comprises a valve controlled in part by gravity and in part by the current of air in the dispatch tube, the arrangement being such that the two forces act in opposition to each other to mainain the valve open when a carrier in the dispatch tube obstructs the free flow of air and substantially closed when the line is clear.

Referring to the drawing, a valve 5 controls the flow of air from the dispatch tube 6 through the valve casing 7 to the exhaust tube 8. If the dispatch tube system is of the vacuum type, the exhaust tube 8 may lead to a suitable suction pump. The valve which is pivoted at 10 comprises oppositely extending wings 11, 12 which close the passage through the valve casing. The wings may be of equal width but of different weight and of different length to effect the desired operation. As shown, the wing 11 is weighted and the valve is so positioned in the port that when the valve is controlled by gravity alone it will assume an open position. The wing 12 is longer to provide a larger area and the arrangement is such that the greater pressure of the current of air on this larger area will tend to close the valve. Furthermore, as shown, the relative position of the valve in the port of the valve casing is such that the air current will impinge more directly upon the wing 12 tending to close the valve.

The closing position of the valve is limited by an adjustable stop screw 15 extending through a slot 16 in the casing and engaging an adjustable filler block 17. The screw and block can be adjusted up and down in the slot 16 and secured in adjusted position. The adjusted position of the filler block and screw determine the width of opening of the port between the end of the wing 11 and a filler block 18.

A carrier discharge outlet 20 is provided at one side of the valve. As shown, the valve casing is extended to form the outlet and the dispatch tube 6 extends into this casing. The outlet is closed at its lower end by an outlet valve 21 of usual construction except that its washer 23 is extended to overlie the end of a passage 24 formed within the valve casing but outside of the tube 6. This passage leads to the valve chamber and immediately upon opening of the valve 21 admits atmospheric air to the dispatch tube behind the carrier, thus preventing the possibility of the carrier being held back by suction.

In operation when there is no carrier in the line, the valve 5 will be maintained in closed position by the suction in the exhaust tube 8; when a carrier is inserted in the line and the free flow of air thereby obstructed the flow through the minimum opening of the valve will cause a partial vacuum in the dispatch tube 6 and as the pressure on the two sides of the valve is more nearly equalized the valve will open to permit a flow of air for moving the carrier. When the carrier passes on and the tube is no longer obstructed by a carrier the flow of air will sufficiently increase to close the valve 5. The closing of the valve is further insured as the carrier passes the discharge tube by the free admission of air through the port 24.

The foregoing particular description is illustrative merely and is not intended as defining the limits of the invention.

I claim:

1. In a control device for a pneumatic dispatch transmission tube, a valve casing, and a valve normally held open by gravity but arranged to be closed by the air pressure when the flow of air exceeds a predetermined limit and to be held closed by the difference in pressure on the two sides of the valve, a slight flow of air being permitted when said valve is closed.

2. A valve casing having a port, and a valve pivoted in said port and normally balanced to be held in open position by gravity, said valve having a wing against which air flowing through the port impinges tending to move said valve to closed position.

3. A valve casing having a port, and a valve pivoted in said casing to close the port thereof, said valve being arranged to be held normally in open position by gravity and to be closed by the pressure of a flowing stream of air against a portion thereof under predetermined conditions, a slight flow of air being permitted when said valve is closed.

4. A valve casing having a port, and a valve eccentrically pivoted in said port and normally balanced to be moved to open position by gravity, said valve having a wing projecting into the path of air flowing through said valve casing to cause a closing movement of said valve.

5. A valve casing having a port, a valve movably mounted in said port and normally gravity controlled to open position, and means whereby said valve is moved to closed position by the flow of a current of air through said valve port, said valve permitting a slight flow of air when closed.

6. The combination with a valve casing having a port and a valve adapted to close said port and arranged to be moved to closed position against a force tending to open the same by a current of air impinging thereagainst, of a carrier discharge outlet adjacent said valve casing and having a pivoted closure, and a port closed by the pivoted closure and leading into said valve casing.

7. In a pneumatic dispatch system a dispatch tube, means for creating a suction in said tube to cause a flow of air therethrough, and a valve for controlling the suction, said valve being urged by gravity toward open position and being urged by said flow of air into substantially closed position, a limited flow of air being permitted around said valve when closed.

8. In a pneumatic dispatch system a dispatch tube normally in communication with the atmosphere but adapted to be cut off from such communication upon insertion of a carrier, means connected with said tube for creating a flow of air through said tube, and a valve between said tube and means adapted to be held closed by a pressure differential created by a predetermined minimum flow of air through said tube around said valve, said valve being automatically opened by gravity upon checking said flow due to the insertion of a carrier.

9. In a pneumatic dispatch system a dispatch tube, means for producing and maintaining a flow of air therethrough, a valve for regulating the flow of air through said tube, said valve being controlled directly by the stream of air to close the valve when the flow exceeds a normal carrier propelling rate, said valve when closed permitting a minimum flow which is normally maintained, and means attached to said valve for opening the valve whenever the flow drops below said minimum.

10. In a pneumatic dispatch system a dispatch tube, means for producing and maintaining a flow of air therethrough, a valve for regulating the flow of air through said tube, said valve being controlled directly by the stream of air to rapidly close the valve when the flow exceeds a predetermined carrier propelling rate, said valve when closed permitting a minimum flow which is normally maintained, and means attached to said valve for rapidly opening the valve whenever the flow drops below said minimum.

11. Power saving apparatus for a pneumatic tube system of the dual flow type, said apparatus comprising a normally closed valve, a motor for opening the valve and holding said valve open in response to a changed air pressure upon the dispatch of a carrier, the said valve being closed by the kinetic action of the air column upon the valve when the carrier is delivered.

12. In a pneumatic tube system of the dual flow type, an air flow controlling valve retained in a closed position by reason of the air pressure or the partial vacuum in a chamber on one side of said valve, and means attached to the valve and operative to open it because of the pressures on opposite sides of the valve approaching a balance.

13. In a pneumatic tube system of the dual flow type, an air flow controlling valve retained in a closed position by reason of the air pressure or the partial vacuum in a chamber on one side of said valve, and means attached to the valve and operative to open it because of the pressures on opposite sides of the valve approaching a balance, said valve to be closed by the kinetic action of the air upon the release of a carrier from the air flow.

14. In a pneumatic dispatch system of the minimum flow type, a transmission tube, an exhaust tube connected to a source of suction, and a normally closed control valve interposed between the tubes for regulating the flow of air therethrough a minimum flow of air being permitted when the valve is closed, said valve being directly responsive to pressure variations in the transmission tube for causing opening and closing thereof.

15. In a pneumatic dispatch tube system of the minimum flow type, a transmission tube, an exhaust tube connected to a source of suction, and a normally closed control valve interposed between the tubes for regulating the flow of air therethrough, a minimum flow of air being permitted when the valve is closed, said control device including a valve member normally held on its seat by suction acting directly on the under side thereof, and means arranged to assist in moving the valve member to its open position in response to the direct action of the increased suction on the upper side of the valve member resulting from the introduction of a carrier in the transmission tube.

16. In a pneumatic dispatch system a dispatch tube, means for creating an air flow through said tube, a valve adjacent the delivery end of said tube for controlling the operation of said means, said valve permitting a predetermined minimum flow and being held in closed position by the pressure differential on the two sides thereof during said minimum flow and being shifted by gravity to open position whenever said air flow is reduced below a predetermined minimum.

JOSEPH JOHN STOETZEL.